United States Patent [19]

Thomas

[11] Patent Number: 4,682,746
[45] Date of Patent: Jul. 28, 1987

[54] CONTROL FORCE GENERATOR
[75] Inventor: Andrew S. W. Thomas, Marietta, Ga.
[73] Assignee: Lockheed Corporation, Calabasas, Calif.
[21] Appl. No.: 678,347
[22] Filed: Dec. 5, 1984
[51] Int. Cl.[4] .......................... B64C 21/00; B64C 5/06
[52] U.S. Cl. ...................................... 244/207; 244/91; 244/52
[58] Field of Search ............................. 244/207, 91, 52
[56] References Cited

U.S. PATENT DOCUMENTS

| 271,485 | 11/1983 | Tucson | 244/91 |
|---|---|---|---|
| 2,568,812 | 9/1951 | Lee | 244/207 |
| 3,362,660 | 1/1968 | Tyler | 244/207 |
| 3,367,581 | 2/1968 | Kizilos et al. | 244/207 |
| 4,247,062 | 1/1981 | Brueckner | 244/91 |
| 4,398,687 | 8/1983 | Nichols, Jr. et al. | 244/207 |

FOREIGN PATENT DOCUMENTS

| 2628391 | 12/1977 | Fed. Rep. of Germany | 244/91 |
|---|---|---|---|
| 1031339 | 6/1966 | United Kingdom | 244/207 |
| 1251063 | 10/1971 | United Kingdom | 244/207 |

Primary Examiner—Galen Barefoot
Assistant Examiner—Lynn M. Fiorito
Attorney, Agent, or Firm—Eric R. Katz

[57] ABSTRACT

A control force generator for an aircraft using circulation control to a selectively produce lift on an otherwise non-lift surface. The generator employs a novel, double-slot single Coanda surface arrangement for selectively generating the aerodynamic lift.

1 Claim, 10 Drawing Figures

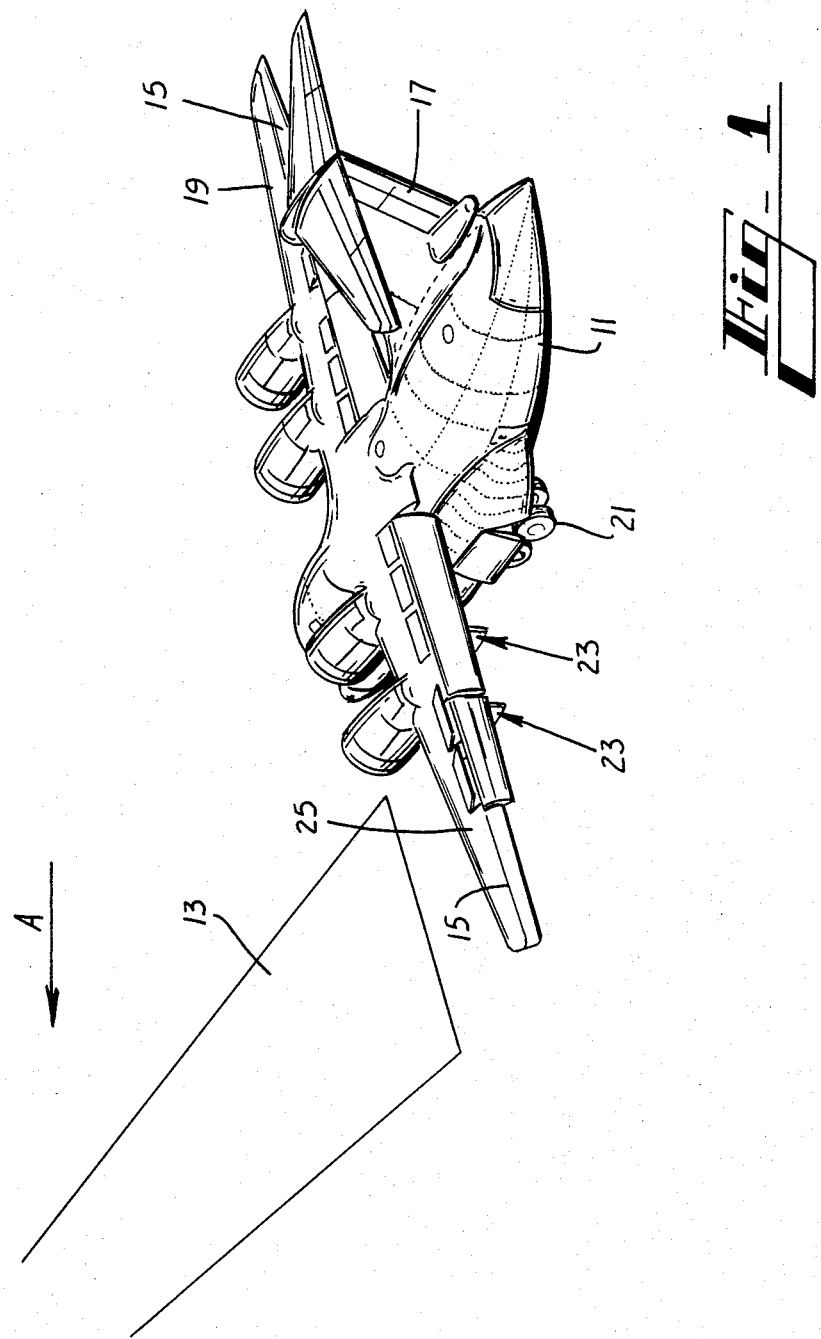

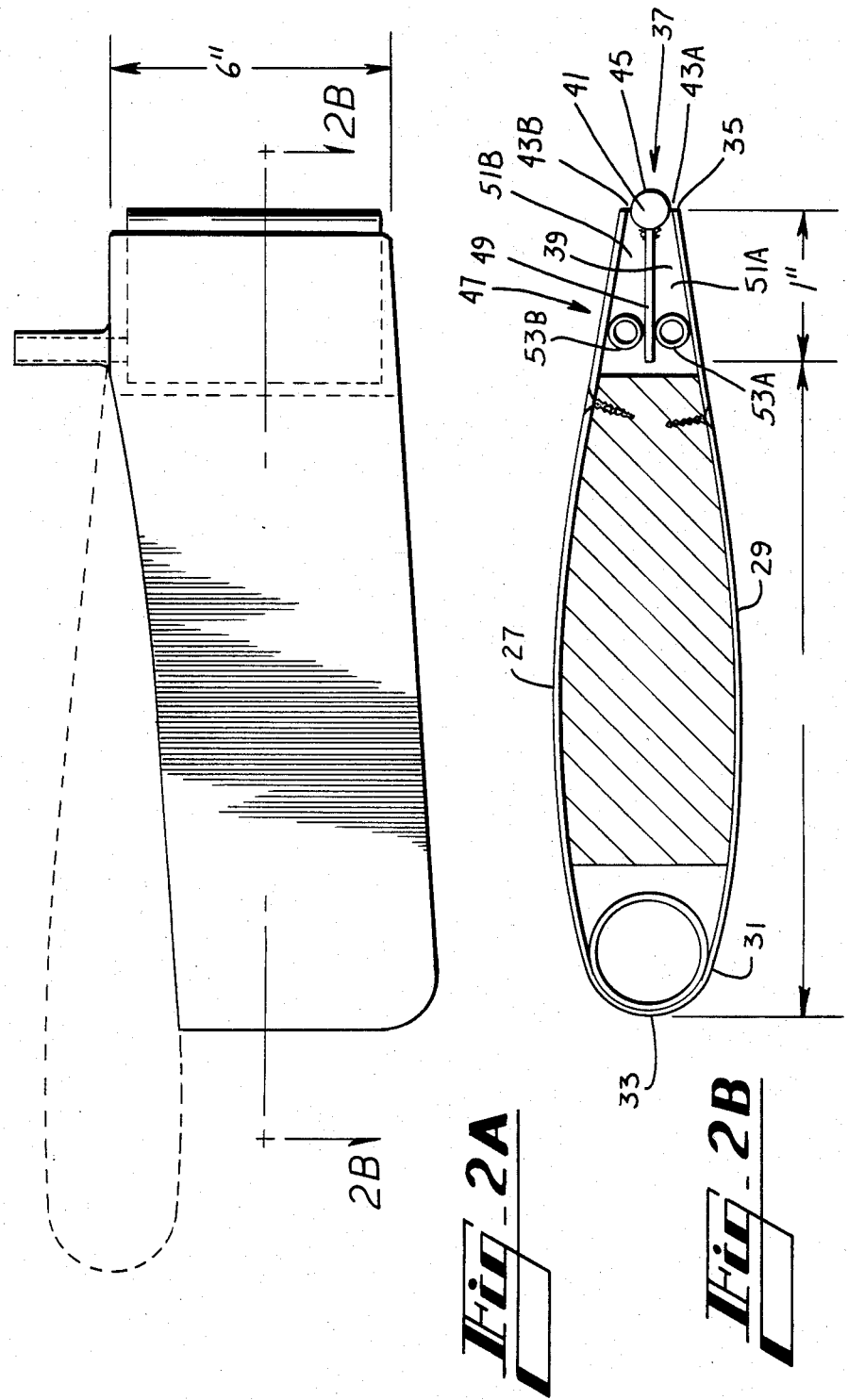
Fig_2A  Fig_2B

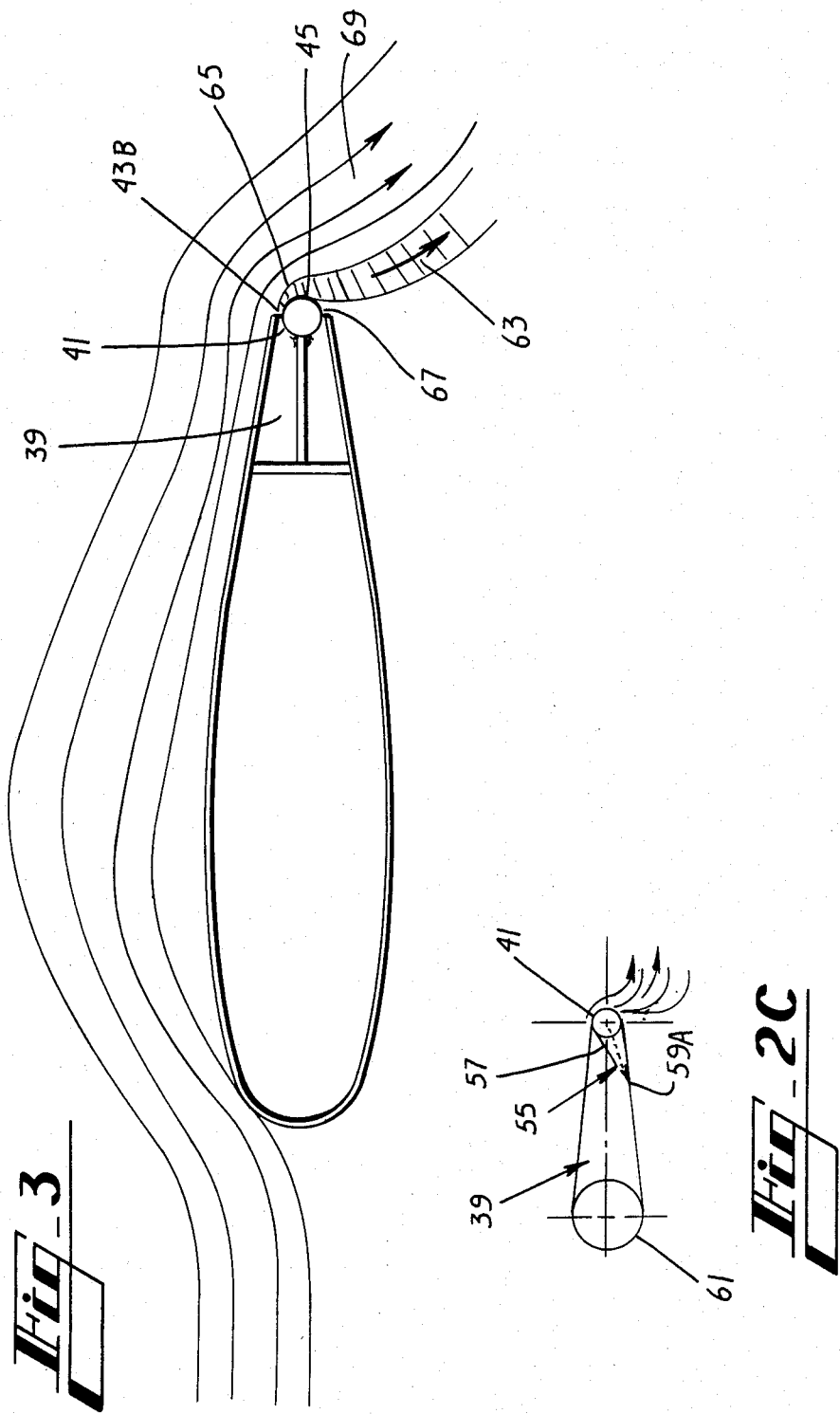

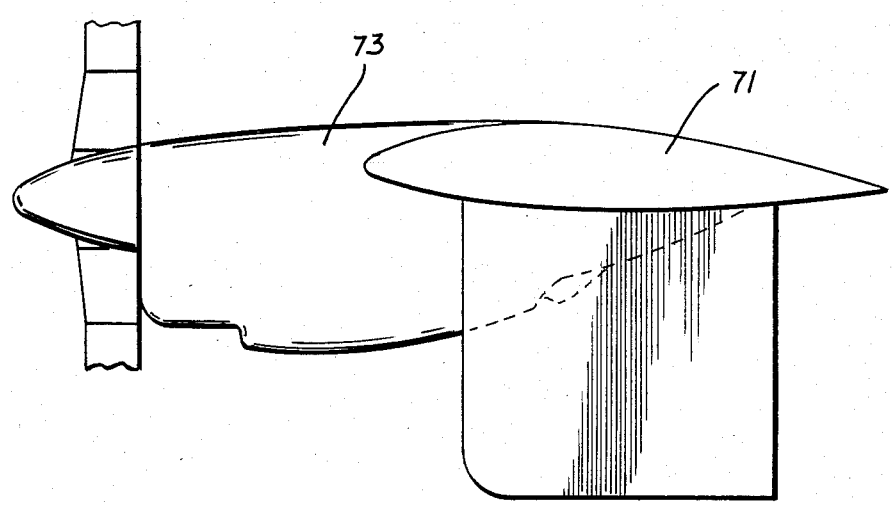
*Fig_4*
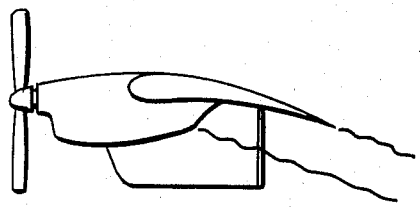
*Fig_5A*
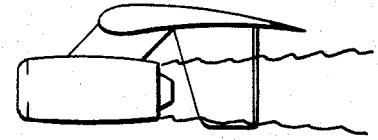
*Fig_5B*
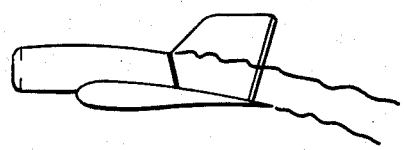
*Fig_5C*
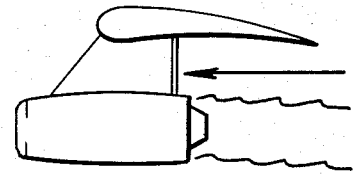
*Fig_5D*

CONTROL FORCE GENERATOR

TECHNICAL FIELD

This invention generally relates to fluid control surfaces for generating control forces and more particularly to a control force generator utilizing circulation control in a double slotted, single Coanda surface arrangement for selectively generating aerodynamic lift on an otherwise nonlifting surface.

BACKGROUND OF THE INVENTION

The need to utilize short and narrow, austere landing fields, particularly for STOL aircraft, requires accurate glidepath and directional control to limit dispersion on landing. While airfield performance is improved with lower speed operation, the handling qualities and controllability of STOL aircraft diminish significantly at the slower approach speeds experienced during a STOL landing.

Upon certain conditions of aircraft operation, the relatively streamline airflow across the upper surface of the wing can become partially or substantially separated from the upper surface thereof, resulting in a substantial loss of control. This flow separation, or stall condition, typically occurs with an aircraft wing at relatively low flying speeds found, for example, at landing and takeoff conditions when the wing is operated at a relatively high angle of attack and when maximum lift generation is particularly critical. This loss of control, resulting from the above-noted stall condition, is also applicable to aerodynamic stability and control surfaces, such as, for example, ailerons, rudders, and elevators.

Airflow separation from an airfoil is a particularly onerous problem when designing an aircraft for STOL operation. Because large pitching moments and engine-out yawing and rolling moments are associated with known powered-lift arrangements in the STOL mode, the conventional aircraft, configured for STOL performance, requires large control surfaces. These large control surfaces result in a drag penalty at cruise. Furthermore, even with the use of large control surfaces, the airspeed needed for minimum control is relatively high compared to that which is theoretically possible with the optimum powered-lift arrangements.

In order to provide a pilot with a greater lateral response for a given control input at STOL operation and thus reduce the time required for improving lateral tracking errors, enhanced sideforce controls are necessary. Known solutions include thrust deflection vanes positioned in the slipstream as well as the deflection of ailerons and rudders having large control surfaces as previously noted.

One problem with the movable vane configuration is large thrust losses. Additionally, the movable vanes require complex actuators which are difficult to maintain, thus providing a reduced reliability of performance.

As noted above, the use of ailerons and rudders having large control surfaces has the problem of resulting in a drag penalty at cruise. Further, aileron and rudder deflections induce yawing and rolling moments which are quite undesirable near the ground and can result in contact with obstacles and the loss of the aircraft.

DISCLOSURE OF THE INVENTION

It is, therefore, an object of the present invention to provide a control force generator for furnishing a control force to an aircraft without the attendant roll and yaw normally associated with coordinated use of conventional control surfaces such as ailerons and rudders.

Another object of the present invention is to provide a control force generator configured to maximize its aspect ratio and thus minimize thrust losses and reducing drag.

Yet another object of the present invention is to provide a control force generator which eliminates the need for increasing the size of conventional control surfaces such as ailerons and rudders.

Still another object of the present invention is to provide a control force generator for providing at least a lateral force independent of other control forces or in conjunction therewith.

A further object of the invention is to provide a control force generator which is relatively simple in construction and operation to provide increased reliability of performance as well as a reduced cost of construction and a lightweight configuration.

One advantage of the present invention is ease with which the control force generator is retrofitted to existing aircraft configurations.

One feature of the present invention is the use of circulation control in a novel double slot, single Coanda surface arrangement for selectively generating aerodynamic lift on an otherwise non-lifting surface.

In accordance with these and other objects, advantages, and features of the present invention there is provided a control force generator for furnishing a control force for an aircraft, the generator comprising a source of compressed fluid and a pair of substantially symmetrical, spaced, aerodynamic surfaces forming a vane having a given chord length and span as well as leading and trailing edges. A fluid discharge slot is provided for discharging the compressed fluid from the trailing edge of the vane and a plenum adjacent to the discharge slot connects the slot to the source of compressed fluid. A fluid control surface, positioned adjacent the fluid discharge slot, forms first and second Coanda effect circulation control ports each having a given width h. The control surface extends beyond the trailing edge and has a substantially rounded trailing edge forming a single Coanda surface with a given radius r. Control port selection means are provided to selectively discharge the compressed fluid from the plenum to one of the control ports. The discharged fluid becomes attached to a portion of the Coanda surface adjacent the selected port and is deflected substantially tangentially to the Coanda surface resulting in the production of lift by one of the symmetrical, aerodynamic surfaces.

BRIEF DESCRIPTION OF THE DRAWINGS

FIG. 1 illustrates, in perspective, a STOL, powered-lift aircraft on a crosswind approach to land;

FIG. 2A is a side view of the vane comprising the control force generator of the invention;

FIG. 2B is a sectional view taken along line 2—2 of FIG. 2A;

FIG. 2C illustrates an alternative embodiment of the control port selection means of the present invention.

FIG. 3 illustrates the operation of the control force generator in accordance with the present invention.

FIG. 4 illustrates the vertical attachment of the vane to the bottom of a wing so that the control force provided is a lateral force; and FIGS. 5A–5D illustrate alternative positioning of the vanes of the present invention.

BEST MODE FOR CARRYING OUT THE INVENTION

Referring to FIG. 1, a STOL, powered-lift aircraft 11 is depicted on a landing approach to a short and narrow, austere landing field 13. Arrow A illustrates the local wind direction which in the case portrayed results in a crosswind landing requirement.

Using the conventional control surfaces, e.g. ailerons 15 and rudder 17, the pilot typically compensates for the cross-wind by lowering the windward wing 19 using ailerons 15. Additionally, in order to align the aircraft with the landing field 13, the pilot must make a forward slip of the aircraft 11 into the wind using the rudder 17.

The above-noted control inputs results in undesirable roll and yaw positioning of the aircraft 11. With the windward wing 19 lowered, the likelihood of contacting a ground obstacle is greatly increased. Without the above-noted control input an apparent sidewise or crab motion results with respect to the ground as well as misalignment of landing gear 21, because of the direction of travel of the aircraft 11, and the landing field 13.

In accordance with the present invention, aircraft 11 is provided with control force generators 23 under each wing 19 and 25 for providing, for example, at least a lateral force in addition to the control forces provided by ailerons 15 and rudder 17. The number and position of the generators 23, illustrated by FIG. 1, is by way of examples only, the number and positioning of the generators 23 being determined by the aircraft size and configuration as well as the desired amount and direction of the control force. Additionally, the control force provided by the generator 23 can be utilized in conjunction with or independent of the control forces provided by the conventional control surfaces of aircraft 11.

FIG. 2B illustrates a sectional view, taken along line 2—2 of FIG. 2A, of the control force generator 23. The generator 23 comprises a pair of substantially symmetrical, spaced, aerodynamic surfaces 27 and 29, respectfully, which form a vane 31 having a leading edge 33 and a trailing edge 35. Further, the vane 31 is provided with a given chord length C and a span B as best seen in FIG. 2B. Because the aerodynamic surfaces 27 and 29 are symmetrical, the vane 31 will not produce any lift when positioned in a chordwise flow of fluid.

A fluid discharge slot, generally indicated at 37, is provided for discharging a compressed fluid from the trailing edge 35 of the vane 31. A plenum 39, adjacent to the fluid discharge slot 37, connects the slot 37 to a source of compressed fluid (not shown).

A fluid control surface 41, positioned adjacent the fluid discharge slot 37, forms first and second Coanda effect circulation control ports 43A and 43B, each having a given slot width h. As illustrated, the control surface 41 extends beyond the trailing edge 35 of the vane 31 and has a substantially rounded Coanda surface having a given radius r.

Control port selection means, generally indicated at 47, selectively discharges the compressed fluid from the plenum 39 to one of the control ports 43A or 43B, respectively. In the embodiment illustrated by FIG. 2B, the control port selection means 47 comprises a member 49 which not only divides plenum 39 into two separate plenums 51A and 51B, respectively, but also supports control surface 41. Each plenum 51A and 51B is provided with a valve 53A and 53B, respectively, to control the passage of compressed fluid from the source (not shown) to the respective plenum 51A or 51B and thus the discharge of fluid from the selected control port 43.

Alternatively, as shown in FIG. 2C, the selection means 47 comprises a selector vane, generally indicated at 55, which comprises the fluid control surface 41, rotatably mounted for movement about its longitudinal axis, and a wedge-shaped sealing means 57, positioned in the undivided plenum 39. By rotating the selector vane about the longitudinal axis of the control surface 41, wedge-shaped sealing means 57 abuts one of the side walls 59 of plenum 39 to seal the adjacent control port 43 and permit passage of the compressed fluid through the other control port 43. Also included is a single valve 61 which selectively permits the passage of compressed fluid from the fluid source (not shown) to plenum 39.

The operation of the generator 23 is best illustrated with reference to FIG. 3 wherein control port 43B is selectively connected to a source of compressed air, for example, the bleed air from an aircraft engine. As a result, a fluid jet 63 is discharged from the selected port.

Whenever a jet flows in a body of relatively stagnant fluid (i.e. stagnant relative to the fluid jet) it entrains some of the surrounding fluid and starts it in motion. FIn the case illustrated, as the ambient fluid is entrained and carried along the sides of jet 63, replenishing fluid continuously moves into this region.

Along the open air 65, the replenishing fluid continuously moves in unimpeded and the average pressure along this side is essentially ambient pressure. However, in area 67, adjacent the fluid control surface 41, the replenishing fluid must flow down through the restricted opening between the Coanda surface 45 and the adjacent jet boundary. The average pressure on the Coanda surface side, therefore, is somewhat below ambient.

The resultant differential in pressure between the two areas 65 and 67 causes the jet 63 to move closer to the Coanda surface 45, further reducing the pressure in area 67 until the jet 63 becomes attached to a portion of the Coanda surface 45. The attachment of jet 63 to the Coanda surface 45 caused the jet 63 to be deflected substantially tangentially to the surface 45.

The attachment of jet 63 to Coanda surface 45 results in an entrainment of the fluid flow stream 69 adjacent to the trailing edge next to the selected control port, which in the case illustrated, is control port 43B. The entrainment of stream 69 results in the imparting of a flow velocity to stream 69 in the direction of Coanda surface 45.

The downstream deflection of the fluid flow stream 69 by jet 63 effectively results in an apparent increase in the angle of attack of the fluid flow over the leading edge 33 as experienced by surface 27, adjacent the selected control port 43B thus resulting in the production of lift by surface 27. Previous to the deflection of jet 63, vane 31 produces no net lift because the aerodynamic surfaces 27 and 29 are substantially symmetrical. However, with the deflection of jet 63, as shown, surface 27 produces lift resulting in a net force substantially perpendicular to and away from surface 27.

If vane 31 is mounted vertically on an aircraft, the generator 23 will produce a sideforce on the aircraft. Increasing the velocity of stream jet 63 achieves an increase in te sideforce generated. Selection of the other port 43A will change the direction of the force so as to be substantially perpendicular to and away from aerodynamic surface 29.

Referring to FIG. 4, the generator 23 is configured as a sideforce generator and mounted to the bottom surface of a wing 71 having an engine 73. In this embodiment the generator 23 is mounted such that the 25% value of the chord C of vane 31 passes through the 35% value of the chord of the wing 71. Bleed air from the engines 73 provides the source of compressed fluid which is conveyed to plenum 39.

The generator 23 can be mounted on a wing, as illustraded in FIG. 4, or on the fuselage of the aircraft. When mounted to a wing, the generator can be positioned to to deflect propeller thrust as illustrated in FIG. 5A or jet thrust as shown in FIGS. 5B–5C. Alternatively, the generator 23 can be positioned independently of the engine thrust as shown in FIG. 1. Additionally, the generator can be positioned above or below the wing, as shown in FIGS. 5C and 5B, respectively, or both above and below the wing as well as be incorporated in an engine support pylon, as shown in FIG. 5D, as in, for example, over the wing blowing, or incorporated with a control surface such as rudder, aileron, elevator or the like.

Preliminary studies show that four approximately 6 ft. span by 7 ft. chord length circulation control vanes 31 provide a 15-foot sidestep in a 100 ft. altitude change on a 6-degree glideslope at 90 knots. The vanes 31 can also negate an 11-knot crosswind at 90 knots forward speed, thereby overcoming drift and permitting a landing without roll or yaw.

For a vane with an assumed $C_{L\ max.}=3.0$ and $C_\mu=0.2$, the mass fluid flow blowing requirements are calculated as follows:

$$r/c = 0.01 \text{ and } 0.01 < h/r < 0.05$$

where
r=trailing edge radius,
h=slot width,
c=7 ft. chord,
thus
r=(0.8")≃1.5" diameter, and
h=0.05×0.08=0.04 inches.

Assume the worst case, h=0.1 inches. The mass flux blowing requirements are calculated as follows:

Momentum Coefficient normally used is $$C\mu = \frac{(m/g)\ V_j}{\frac{1}{2}\rho_0 V_0^2 S}$$

where $\frac{1}{2}\rho_0 V_0^2 = q =$ the dymanic pressure=28 psf
S=surface planform=40 sq ft
m=blowing flow rate in lb/sec
$V_j$=theoretical jet velocity reached in isentropic expansion from duct stagnation pressure $P_D$ to free stream pressure $P_0$. This is given by:

$$V_j = 109.57\ (T_D)^{\frac{1}{2}} \left\{ 1 - \frac{P_0^{2/7}}{P_D} \right\}^{\frac{1}{2}} \text{ ft/sec}$$

where
$T_D$=duct stagnation temperature (K.°)
$P_D$=90 psia
$T_D$=570° F.=300° C.=573° K.
so $V_j$=1663 ft/sec for each engine
thus $$M = \frac{C\mu \cdot q \cdot q \cdot S}{V_j} = 3.7 \text{ lb/sec}$$

In order to sustain this mass flux blowing rate, a small compressor can be used in conjunction with the bleed air from an aircraft engine.

While the invention has been particularly discussed and described with reference to preferred embodiments thereof, it will be understood by those skilled in the art that various alternation in form and detail will be made therein without departing from the spirit and scope of the invention as described by the attached claims.

I claim:

1. A control force generator for furnishing a control force for an aircraft having wings and at least one engine, the generator comprising:
   (a) a source of compressed fluid;
   (b) a pair of substantially symmetrical, spaced, aerodynamic surfaces forming a vane having a given chord length and span as well as leading and trailing edges, said vane being affixed beneath the wing of the aircraft substantially perpendicular thereto and being positioned so that the forward 25% vane chord passes approximately through the forward 35% chord of the wing;
   (c) a fluid discharge slot for discharging the compressed fluid from the trailing edge of the vane;
   (d) a plenum adjacent to the discharge slot for connecting the fluid discharge slot to the source of cmpressed fluid;
   (e) a fluid control surface, positioned adjacent the fluid discharge slot, for forming first and second Coanda effect circulation control ports, each having a given width h, the control surface extending beyond the trailing edge of the vane and having a substantially rounded trailing edge forming a single Coanda surface with a given radius r; and
   (f) control port selection means for selectively discharging the compressed fluid from the plenum to one of control ports, the control port selection means comprising:
   (1) support means for rotatably supporting the fluid control surface for rotation about its longitudinal axis;
   (2) a wedge-shaped sealing means for sealing a control port, the sealing means being affixed to the fluid control surface and positioned within the undivided plenum; and
   (3) means for moving the fluid control surface about its rotational axis, so that when the control surface is rotated the wedge-shaped sealing means abuts one side of the plenum, and the sealing means forms a fluid seal with respect to the control port next to the side of the plenum abutted to permit discharge of the compressed fluid from the other port;
   whereby the fluid discharged from a selected control port becomes attached to a portion of the Coanda surface adjacent the selected port and is deflected substantially tangentially to the Coanda surface resulting in a downstream deflection of the fluid flow through which the vane is traveling so that lift is produced by the aerodynamic surface adjacent the attached control port to provide a control force.

* * * * *